Patented Apr. 28, 1942

2,280,802

UNITED STATES PATENT OFFICE 2,280,802

METHOD OF MODIFYING ORGANIC CHEMICAL MATERIALS

Harlan A. Depew, Gloucester City, N. J.

No Drawing. Application October 4, 1937,
Serial No. 167,331

6 Claims. (Cl. 260—406)

This invention relates to the chemical rearrangements of organic materials that often are spoken of as polymerization, depolymerization, and isomerization. It also relates to reacting organic materials with gaseous chemical materials in which polymerization and isomerization are usually factors.

As an example, linseed oil is heat treated to make it suitable for industrial use. This heat treatment can take place either with air excluded or with air present, according to the product that is desired. Other materials such as for example, tung oil, are also heat treated to make them suitable for industrial uses. Other examples of polymerization are the polymerization of materials such as chloro-butadiene, isoprene, and butadiene to artificial rubbers.

An example of isomerization is the treatment of rubber with SnCl4 to arrange the molecular structure so as to make it useful as a resin. Also, rubber is reacted with HCl to form rubber hydrochlorides.

In general these reactions are carried out in vats where serious difficulties may develop including uneven heating caused in some cases by the exothermic nature of the reaction. The material of the vat may also contaminate the product and the reactions are frequently slow. The processes have been largely empirical. The amount of surface of the liquid exposed to the air and the area of the container exposed to the heating elements have had to be rigidly controlled and it has been difficult to work the processes out on a large scale.

In some cases an effort has been made to carry out this heat treatment by flowing the organic material through a heated coil. This offers the advantage of being able to check the reaction when the process is completed, but sometimes the material has been known to actually set solid in the coils.

In carrying out my invention I avoid many of the difficulties by doing without these large vats for the reaction. Frequently a superior result can be obtained in a short time at a higher temperature by my process than can be obtained in a long time at lower temperatures using conventional processes. I take the oil or other organic material and disperse it, either raw or after a preliminary treatment in vats, into a carrying gas in the form of particles by spraying or some other suitable method. The resultant fume is conveyed through a trail to a collecting device or in some cases where the material is not too sticky to a bag room. While the fume is being carried to the bag room it passes through reaction chambers where due to the temperature or the nature of added gases, or both, the reaction proceeds to completion. The fume may be formed in a heated chamber or it may receive its heat treatment as it proceeds along the trail. Each little droplet or particle of the fume that is undergoing reaction is in a sense, a tiny vat, and my process consists from this viewpoint in carrying on the reaction in a number of tiny reaction chambers, each of which are small enough to keep the reaction from getting out of control. Due to the surface tension there is a skin on the outside of each droplet when the particle is liquid that might be likened to the material of a conventional vat. Since the material is finely divided and separate, there is no tendency for coagulation in one part of the material spreading throughout.

No word is available to explain exactly what I mean by these droplets or tiny solid aggregates of material that are to serve as tiny reaction vats and from now on they will be spoken of as "vatlets." I use this term to show that my ingredients are not dispersed molecularly in the carrying gas. The size and condition of these vatlets can be varied widely as is known to those experienced in spray drying. The gas is provided to keep the vatlets separate and to convey the product in a finely divided condition from the reaction chamber through a trail to the separator. I refer to this gas as carrying, separating, or dispersing. In many cases, the evaporation of water (or other liquid) or the formation of gaseous by-products of the reaction furnish the necessary carrying gas. In others, nitrogen has been used.

The carrying gas may be inert or reactive and can be circulated if so desired. In many cases where linseed oil is used for varnishes, it is heated with a limited oxygen content. The amount of oxygen must not be sufficient to allow the reaction to become so violent that a fire will occur. On the other hand, the oxygen content can be high enough to completely oxidize the linseed oil to a "scrim." Under varying conditions the amount of oxygen may vary from less than 1% to more than that present in air. For safety reasons, the reaction chambers may be elongated with blowout disks in the ends.

An oxidized and polymerized linseed oil made in this way, in a finely divided condition, can be practically completely reacted with a minimum of coagulation. As a result, the product is superior to that made by the well known Walton or Wood Bedford method. By properly controlling the oxidising character of this dispersing gas, the ratio of oxidation to polymerization and to coagulation can be controlled.

As an example I sprayed ¼ pound of linseed oil into a chamber heated at 250° C. with nitrogen and less than ¼% of oxygen. The product that was caught in the bag room was spongy and slightly sticky with the particles loosely adherent. With a little more complete polymerization, the linseed oil forms in a dry condition.

The value of polymerized linseed oil and of artificial rubber in a finely divided condition is of special value in the formation of water dispersions (artificial latex).

It is obvious in carrying out this reaction that catalysts such as lead linoleate can be used when desirable.

I have treated linseed oil as a single chemical ingredient, whereas it is actually a mixture of glycerides, partly saturated but mostly unsaturated. The general course of the reaction is the same, however, whether one deals with pure glycerine linoleate or linseed oil. The reaction product, however, may be somewhat different depending on the impurities present. This process differs from my copending application, Serial No. 167,332, filed Oct. 4, 1937, in that in this case one organic material constitutes the material of a vatlet, whereas in my copending application, I react two or more materials together that are dispersed as vatlets.

In the case of polymerized tung oil the finely divided oil in the form of vatlets can be brought up to temperature almost immediately and the reaction can be chilled when necessary at a desired point in the trail.

The heat necessary to bring up the temperature may be furnished in many ways, such as external heating, by the introduction of hot carrying gas, such as superheated steam, and in some cases through the exothermic nature of the reaction.

Chemical reactions have been carried out in finely divided form previously. For example, an oil burner. In this case, however, the goal is not to make a new product but rather to burn the oil.

In the case of some reactions, two or more reaction chambers can be used in series with different atmospheres. For instance, the first may be acid and the second basic. The one reaction chamber may be at low temperature to initiate the reaction, and the second can be at higher temperature to drive the reaction further. It will be obvious that there are many temperature and gaseous atmosphere possibilities. The conduction of a fume through a long trail offers innumerable possibilities for adjustment.

Among available reactive gases I might mention $SO_2$, hydrogen, ammonia, chlorine, HCl, and many more or less complex gaseous compounds. As an example, consider the process described in U. S. 2,044,007 involving oxidations, chlorination, and dechlorination. Such a procedure could be carried out very well by my fume process.

It is possible to spray materials that should not be heated for the desired product at above 180° C. for example, and nevertheless spray the partially reacted product into a high temperature atmosphere such as 350° C. The evaporation of the water or other extraneous material can keep the temperature of the vatlets in the fume low enough so that the product will not be heated above the 180° C.

The heat is also dissipated as the fume moves along the trail and the temperature can be reduced accordingly to a safe figure. In cases where heat is generated, due to an exothermic reaction, the temperature can be held down safely by rapid conduction of the fume through a trail that is losing heat.

In some cases there is a tendency for the particles to coalesce when it is desired that they shall remain separated. The use of protective colloids such as glue, dextrin, and proteins helps in some cases to keep the particles separate. Microscopic examination of organic materials made in the disperse form show fine particles well below a micron in size to particles of 10, 20, or more microns depending on the condition of dispersion as worked out in the art of spray drying.

The method for obtaining the materials in finely divided form in a gaseous medium will depend on the particular raw materials and the products desired. In many cases the raw materials are liquid or they may be solids dispersed in a liquid; the latter may be atomised by spraying. Sometimes immiscible liquids can be mixed by turbulence and atomised immediately afterward to form heterogeneous droplets. Or the reaction can be initiated by conventional methods and the intermediate product can be sprayed, dispersed by a whirling disk or otherwise dispersed in the reaction chamber.

In a few cases I have vaporized the raw materials and then applied pressure to cause them to condense as vatlets when the reaction will occur. This pressure may vary from a few pounds to thousands of pounds.

Pressure can be used with advantage in the case of products such as isoprene that might otherwise evaporate.

In other cases, I have worked under pressures below atmospheric. This reduces the amount of carrying gas required and sometimes helps in the elimination of undesirable volatile impurities.

To keep the product from sticking to the walls of the reaction chamber, a certain amount of gas may be added advantageously along the chamber walls. Further, by using a very slight upward gas flow in a large reaction chamber, the reacting particles can be held in the reacting zone for an increased length of time.

Polymerized oils made by this process have greatly improved properties. The large amount of surface makes it possible to further improve the properties by washing with liquids that will dissolve the unpolymerized constituents. In some cases, the amount of impurities can also be lowered by vacuum treatment specially when the product is warmed.

I claim:

1. The method of polymerising organic materials that comprises dispersing them as vatlets in a carrying gas and polymerising them surrounded by a carrying gas so that the product does not come in contact with the walls of the reaction chamber.

2. The method of producing a chemically rearranged linseed oil that consists in dispersing the linseed oil as vatlets into an inert gas, heating the fume, and separating the product from the gas.

3. The method of producing a chemically rearranged and oxidised linseed oil that consists in dispersing the linseed oil as vatlets into an inert gas containing less than 10% of oxygen, heating the fume, and separating the product from the gas.

4. The method of polymerizing linseed oil that comprises dispersing it as vatlets in a carrying gas and polymerizing it surrounded by a carrying gas so that the product does not come in contact with the walls of the reaction chamber.

5. The method of polymerizing tung oil that comprises dispersing it as vatlets in a carrying gas and polymerizing it surrounded by a carrying gas so that the product does not come in contact with the walls of the reaction chamber.

6. The method of polymerizing organic materials to artificial rubber that comprises dispersing them as vatlets in a carrying gas and polymerizing them surrounded by a carrying gas so that the artificial rubber does not come in contact with the walls of the reaction chamber during the reaction.

HARLAN A. DEPEW.